(12) United States Patent
Ashour et al.

(10) Patent No.: US 10,210,908 B2
(45) Date of Patent: Feb. 19, 2019

(54) NON-GREEDY HIERARCHICAL SEGMENTATION OF SERIAL DATA

(71) Applicant: International Business Machines Corporation, Armonk, NY (US)

(72) Inventors: Gal Ashour, Yoqneam (IL); Dror Porat, Haifa (IL); Daniel N Rotman, Karmiel (IL)

(73) Assignee: International Business Machines Corporation, Armonk, NY (US)

( * ) Notice: Subject to any disclaimer, the term of this patent is extended or adjusted under 35 U.S.C. 154(b) by 6 days.

(21) Appl. No.: 15/469,533

(22) Filed: Mar. 26, 2017

(65) Prior Publication Data

US 2018/0277165 A1 Sep. 27, 2018

(51) Int. Cl.
*H04N 5/93* (2006.01)
*G11B 27/00* (2006.01)
*G11B 27/34* (2006.01)
*G06K 9/00* (2006.01)
*G11B 27/031* (2006.01)

(52) U.S. Cl.
CPC .......... *G11B 27/34* (2013.01); *G06K 9/00765* (2013.01); *G11B 27/031* (2013.01)

(58) Field of Classification Search
CPC ............................ G11B 27/34; G06K 9/00765
See application file for complete search history.

(56) References Cited

U.S. PATENT DOCUMENTS 7,529,718 B2   5/2009   Lambert

FOREIGN PATENT DOCUMENTS

WO   2016122591   8/2016

OTHER PUBLICATIONS

Luczak, "Hierarchical Clustering of Time Series Data with Parametric Derivative Dynamic Time Warping", Expert Systems with Applications, vol. 62, 2016, pp. 116-130.
S.K. Tasoulis et al., "Improving Principal Direction Divisive Clustering", SIGKDD, 2008.
Nillson, "Hierarchical Clustering Using Non-Greedy Principal Direction Divisive Partitioning", Information Retrieval, vol. 5, Issue 4, Oct. 2002, p. 311-321.

(Continued)

*Primary Examiner* — Thai Q Tran
*Assistant Examiner* — Girumsew Wendmagegn
(74) *Attorney, Agent, or Firm* — Dan Swirsky alphapatent

(57) ABSTRACT

Segmenting serial data by processing multiple candidate segmentation point sets associated with a serial data set, each candidate set including a different number of candidate segmentation points representing the serial data set as segments in accordance with segmentation criteria, where the processing includes determining, for each of the candidate points, a count of the candidate sets that include the candidate point, and creating, for each of the candidate sets, a corresponding alternative segmentation point set associated with the serial data set, where the alternative set includes n alternative segmentation points representing the serial data set as n+1 segments, where n equals the number of candidate points in the candidate set to which the alternative set corresponds, and where the n alternative points in the alternative set correspond to n of the candidate points having the greatest counts, and arranging the alternative sets in order of their numbers of segmentation points.

14 Claims, 4 Drawing Sheets

(56) References Cited

OTHER PUBLICATIONS

Fu, "A review on time series data mining", Engineering Applications of Artificial Intelligence, vol. 24, Issue 1, Feb. 2011, p. 164-181.

Aggarwal et al., "Combining clustering solutions with varying number of clusters", IJCSI International Journal of Computer Science Issues, vol. 11, Issue 2, No. 1, Mar. 2014, p. 240-246.

Zheng et al., "Hierarchical Ensemble Clustering", 2010 IEEE 10th International Conference on Data Mining, Dec. 2010. p. 1199-1204.

NON-GREEDY HIERARCHICAL SEGMENTATION OF SERIAL DATA

BACKGROUND

In video editing, it is often desirable or necessary to divide a video into multiple segments, such as for efficient storage, removing unwanted segments, rearranging segments, etc. Techniques have been developed for optimally dividing a video into multiple segments, such as in accordance with predefined video segment optimization criteria. Applying such criteria will result in the division of a video at different sets of segmentation points depending on the number of segments desired, where there may be little or no overlap between the different sets of segmentation points.

It is also often desirable to present a software user with a hierarchical view of options from which to choose, where an option that is represented at a higher level of the hierarchical view is preserved at succeeding lower levels of the hierarchical view. A hierarchy is usually a convenient and intuitive way of presenting information at a variety of increasingly granular levels. In a hierarchy, a division that is represented at a higher level of the hierarchy is maintained at succeeding lower levels of the hierarchy. Hierarchies are often constructed using either a "top down" approach in which divisions at higher levels of the hierarchy are split into increasingly granular divisions at lower levels of the hierarchy, or using a "bottom up" approach in which divisions at lower levels of the hierarchy are merged into increasingly fewer divisions at higher levels of the hierarchy. Often, the merges or splits at a given level are determined in a "greedy" manner that represents the "best" merges or splits for that level, even if one or more of these merges or splits result in sub-optimal divisions at one or more other levels of the hierarchy.

SUMMARY

In one aspect of the invention a method is provided for segmentation of serial data, the method including processing multiple candidate segmentation point sets associated with a serial data set, where each of the candidate segmentation point sets includes a different number of candidate segmentation points representing the serial data set as one or more data segments in accordance with predefined segmentation criteria, where the processing includes determining, for each of the candidate segmentation points, a count of the candidate segmentation point sets that include the candidate segmentation point, and creating, for each of the candidate segmentation point sets, a corresponding alternative segmentation point set associated with the serial data set, where the alternative segmentation point set includes a number n of alternative segmentation points representing the serial data set as n+1 data segments, where n equals the number of candidate segmentation points in the candidate segmentation point set to which the alternative segmentation point set corresponds, and where the n alternative segmentation points in the alternative segmentation point set correspond to n of the candidate segmentation points having the greatest counts, and arranging the alternative segmentation point sets in order of their numbers of segmentation points.

In other aspects of the invention systems and computer program products embodying the invention are provided.

BRIEF DESCRIPTION OF THE DRAWINGS

Aspects of the invention will be understood and appreciated more fully from the following detailed description taken in conjunction with the appended drawings in which.

DETAILED DESCRIPTION

Figure 1:
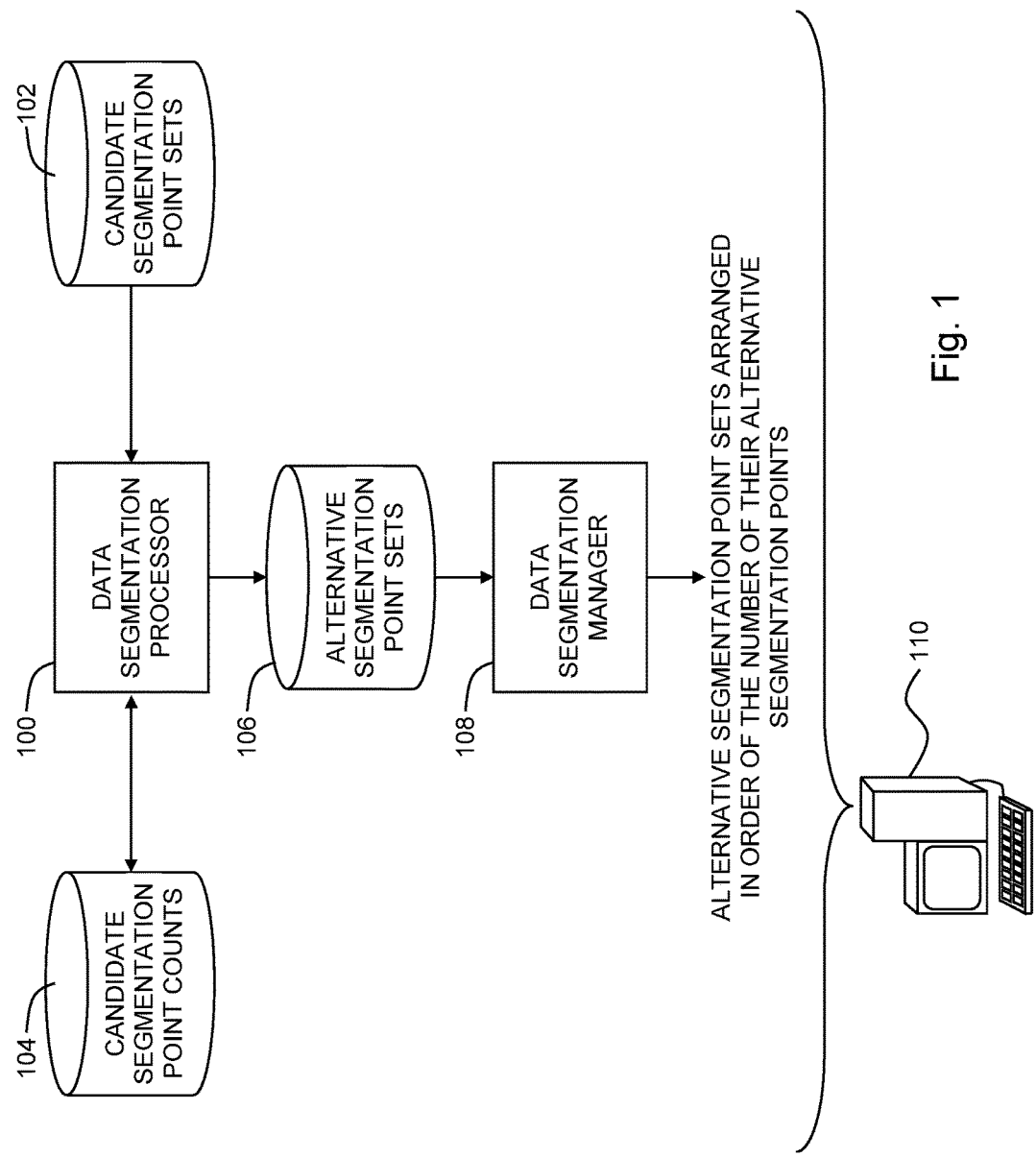
FIG. 1 is a simplified conceptual illustration of a system for segmentation of serial data, constructed and operative in accordance with an embodiment of the invention.

Reference is now made to FIG. 1, which is a simplified conceptual illustration of a system for segmentation of serial data, constructed and operative in accordance with an embodiment of the invention. In the system of FIG. 1, a data segmentation processor 100 is configured to process multiple segmentation point sets 102, hereinafter referred to as candidate segmentation point sets 102, associated with a serial data set 104, such as where serial data set 104 includes video data. Each candidate segmentation point set 102 typically includes a different number of segmentation points, hereinafter referred to as candidate segmentation points when referring to their associated candidate segmentation point sets 102. Candidate segmentation point sets 102 may be defined in accordance with conventional techniques, such as are described by Rotman, et al., in "Robust and Efficient Video Scene Detection Using Optimal Sequential Grouping" (2016 IEEE International Symposium on Multimedia (ISM), December 2013), in which predefined segmentation criteria are used to identify multiple segmentation point sets for segmenting video data into multiple segments, where each segmentation point set includes a different number of segmentation points.

Figure 2A:
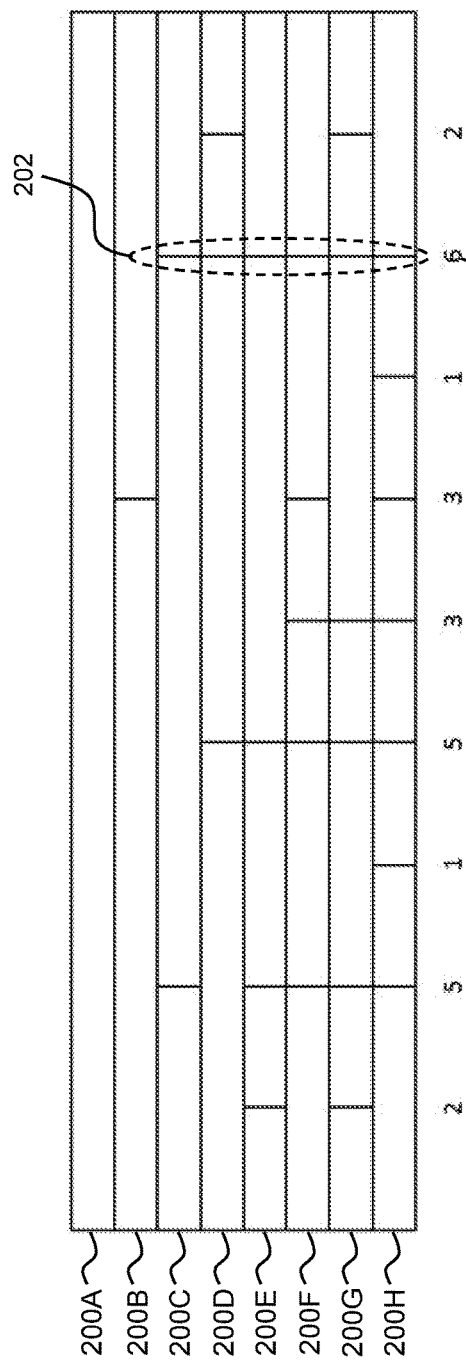
FIGS. 2A and 2B are simplified conceptual illustrations of exemplary segmentation point sets useful in understanding aspects of the invention.

Candidate segmentation point sets 102 and their candidate segmentation points may be illustrated by way of the example shown in FIG. 2A in which a serial data set in the form of a video data file of a given length is shown segmented in accordance with different candidate segmentation point sets 200A-200H, where the video data file is shown as a horizontal bar, and where candidate segmentation points in each of the candidate segmentation point sets are shown as vertical lines. Thus, candidate segmentation point set 200A includes no candidate segmentation points, and therefore its representation of the video data file includes a single video segment, whereas candidate segmentation point set 200E includes four candidate segmentation points, and therefore its representation of the video data file includes five video segments. It will thus be understood that a candidate segmentation point set that includes a number n of candidate segmentation points, where n≥0, represents a video data file as n+1 data segments.

Returning to FIG. 1, data segmentation processor 100 is configured to determine, for each of the candidate segmentation points in the various candidate segmentation point sets 102, a count 104 of the candidate segmentation point sets 102 that include the candidate segmentation point. In the example shown in FIG. 2A, candidate segmentation point sets 200C, 200D, 200E, 200F, 200G, and 200H each include a candidate segmentation point at the same location as indicated in dashed lines at reference numeral 202, and thus the count of the candidate segmentation point sets that include the candidate segmentation point at reference numeral 202 is six, as is shown at reference numeral 202'. Such counts for other candidate segmentation points shown in FIG. 2A are likewise shown beneath each candidate segmentation point.

Data segmentation processor 100 is configured to create a corresponding segmentation point set 106 for each of the candidate segmentation point sets 102 that are associated with the serial data set. Each of the corresponding segmentation point sets 106, hereinafter referred to as alternative segmentation point sets 106, includes a number n of segmentation points, hereinafter referred to as alternative segmentation points when referring to their associated alternative segmentation point sets 106. The n alternative segmentation points in each of the alternative segmentation point sets 106 represent the serial data set as n+1 data segments, where n equals the number of candidate segmentation points in the candidate segmentation point set 102 to which the alternative segmentation point set 106 corresponds, and where the n alternative segmentation points in the alternative segmentation point set 106 correspond to n of the candidate segmentation points having the greatest counts 104. Thus, for example, given a candidate segmentation point set 102 that includes four candidate segmentation points, a corresponding alternative segmentation point set 106 is created that includes four alternative segmentation points, where the four alternative segmentation points are the four candidate segmentation points having the greatest counts 104.

Figure 2B:
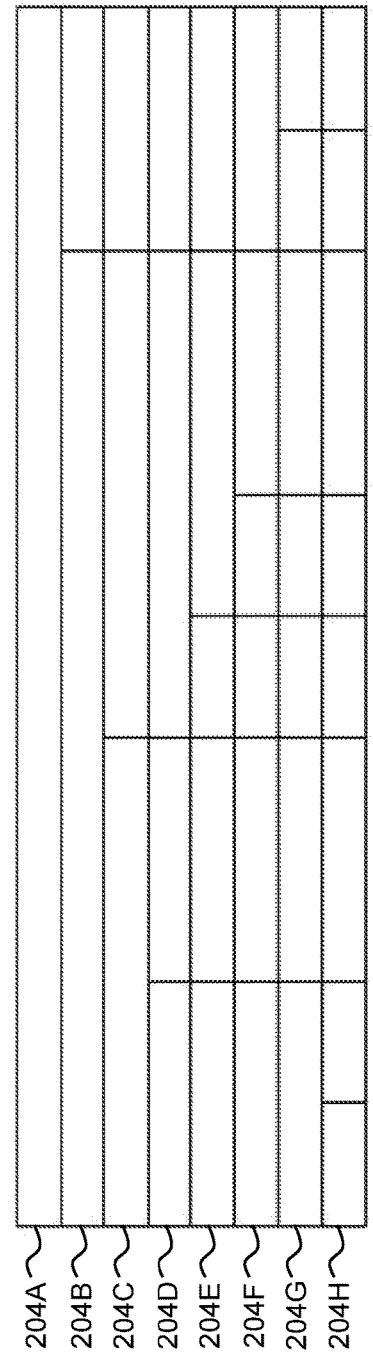

A data segmentation manager 108 is configured to arrange alternative segmentation point sets 106 in order of their numbers of alternative segmentation points. This may be illustrated by way of the example shown in FIG. 2B, in which alternative segmentation point sets 204A-204H for a video data file correspond to the candidate segmentation point sets 200A-200H shown in FIG. 2A for the same video data file. Thus, alternative segmentation point set 204F in FIG. 2B includes five candidate segmentation points and corresponds to candidate segmentation point set 200F in FIG. 2A that likewise includes five candidate segmentation points. The five candidate segmentation points in alternative segmentation point set 204F in FIG. 2B are the five candidate segmentation points having the greatest counts 104, which are the candidate segmentation points whose counts are 6, 5, 5, 3, and 3, respectively, as shown in FIG. 2A. Alternative segmentation point sets 204A-204H are shown arranged in FIG. 2B in a hierarchical view in order of their numbers of alternative segmentation points, where alternative segmentation point set 204A includes no alternative segmentation point, alternative segmentation point set 204B includes one alternative segmentation point, alternative segmentation point set 204C includes the alternative segmentation point of alternative segmentation point set 204B and one additional alternative segmentation point, alternative segmentation point set 204D includes the alternative segmentation points of alternative segmentation point sets 204B and 204C and one additional alternative segmentation point, and so forth where each lower alternative segmentation point set in the hierarchical view includes the alternative segmentation points of the alternative segmentation point sets that are above it in the hierarchical view. Data segmentation manager 108 is preferably configured to present alternative segmentation point sets 106 arranged in order of their numbers of alternative segmentation points, such as on a display of a computer 110. Data segmentation manager 108 is preferably configured to segment the serial data set in accordance with any of the alternative segmentation point sets 106 that are selected from the hierarchical view, such as by a computer user, in accordance with conventional selection techniques.

Any of the elements shown in FIG. 1 are preferably implemented by one or more computers in computer hardware and/or in computer software embodied in a non-transitory, computer-readable medium in accordance with conventional techniques, such as where any of the elements shown in FIG. 1 are hosted by computer 110.

Figure 3:
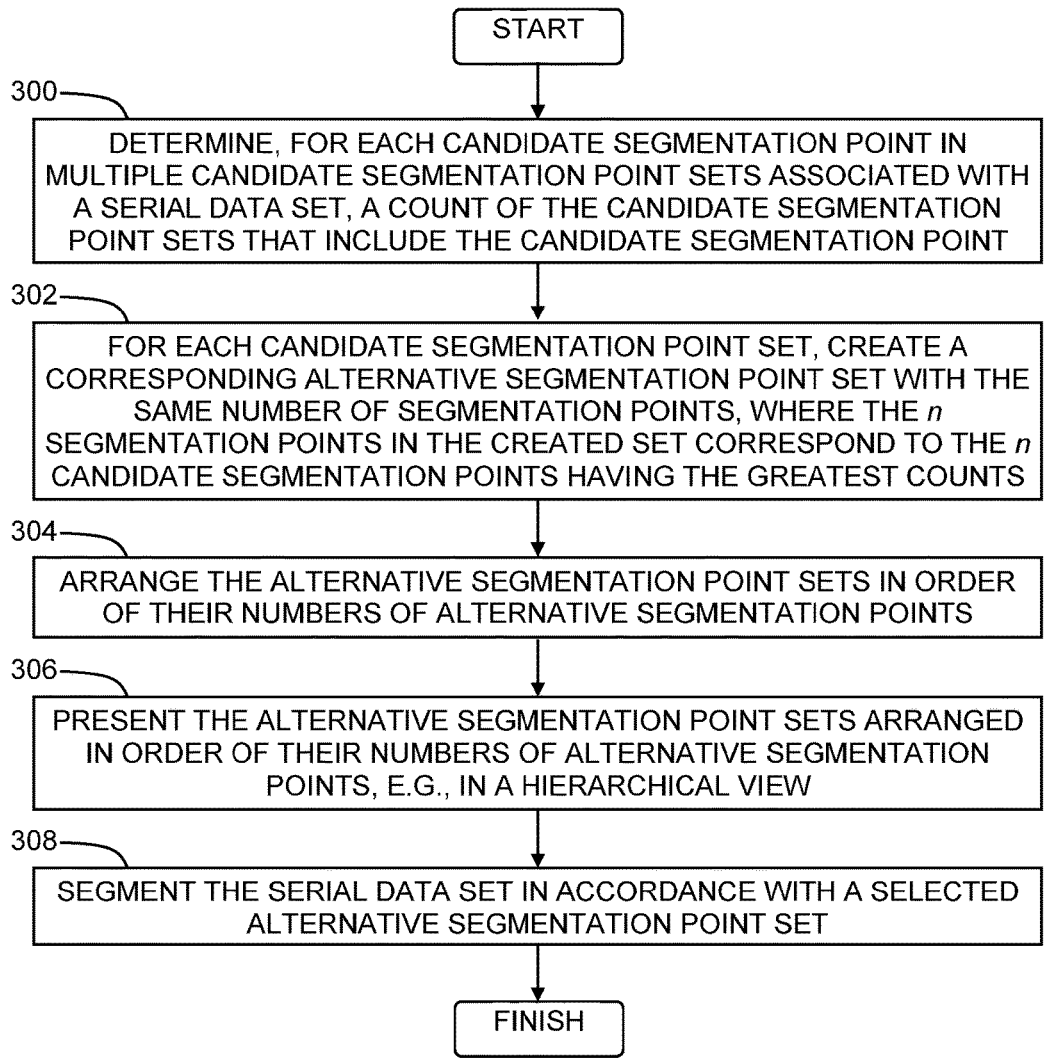
FIG. 3 is a simplified flowchart illustration of an exemplary method of operation of the system of FIG. 1, operative in accordance with an embodiment of the invention.

Reference is now made to FIG. 3, which is a simplified flowchart illustration of an exemplary method of operation of the system of FIG. 1, operative in accordance with an embodiment of the invention. In the method of FIG. 3, for each candidate segmentation point in multiple candidate segmentation point sets associated with a serial data set, a count is determined of the candidate segmentation point sets that include the candidate segmentation point (step 300). For each candidate segmentation point set, a corresponding alternative segmentation point set is created with the same number of segmentation points, where the n segmentation points in the created set correspond to the n candidate segmentation points having the greatest counts (step 302). The alternative segmentation point sets are arranged in order of their numbers of alternative segmentation points (step 304). The alternative segmentation point sets are presented arranged in order of their numbers of alternative segmentation points, e.g., in a hierarchical view (step 306). The serial data set is segmented in accordance with a selected alternative segmentation point set (step 308).

The invention as described herein may thus be employed to provide a hierarchical view of different options for segmenting a serial data set, such as of a video data file, in an increasing number of segments, where a segmentation option that is represented at a higher level of the hierarchical view is preserved at succeeding lower levels of the hierarchical view, and where the segmentation options are determined in a "non-greedy" manner that takes into consideration optimal divisions at various levels of the hierarchy.

Figure 4:
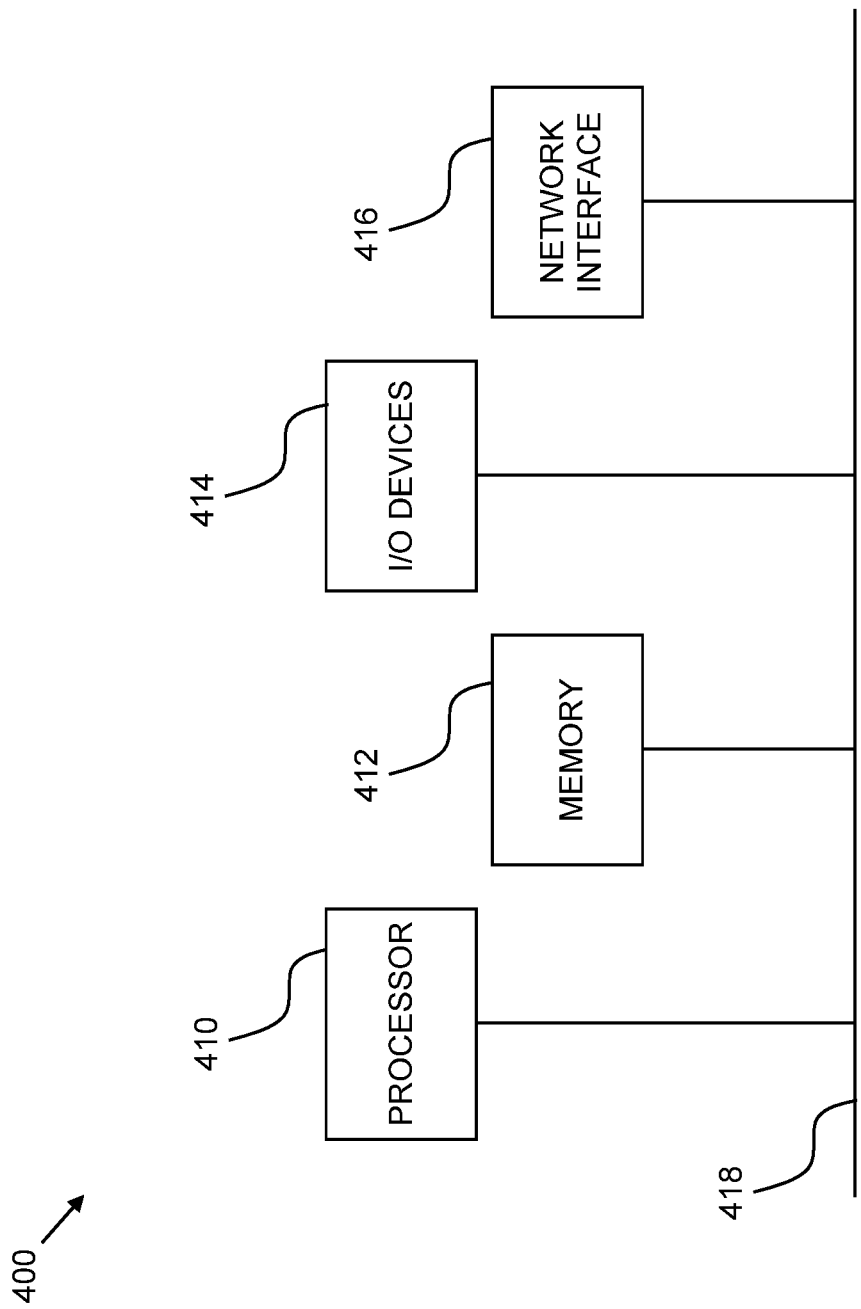
FIG. 4 is a simplified block diagram illustration of an exemplary hardware implementation of a computing system, constructed and operative in accordance with an embodiment of the invention.

Referring now to FIG. 4, block diagram 400 illustrates an exemplary hardware implementation of a computing system in accordance with which one or more components/methodologies of the invention (e.g., components/methodologies described in the context of FIGS. 1-3) may be implemented, according to an embodiment of the invention. As shown, the invention may be implemented in accordance with a processor 410, a memory 412, I/O devices 414, and a network interface 416, coupled via a computer bus 318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Embodiments of the invention may include a system, a method, and/or a computer program product. The computer program product may include a computer readable storage medium (or media) having computer readable program instructions thereon for causing a processor to carry out aspects of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the invention.

Aspects of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for providing a hierarchical view of different options for segmentation of serial data, the method comprising:
   processing a plurality of candidate segmentation point sets associated with a serial data set, wherein each of the candidate segmentation point sets includes a different number of candidate segmentation points representing the serial data set as one or more data segments in accordance with predefined segmentation criteria, wherein the processing includes
      determining, for each of the candidate segmentation points, a count of the candidate segmentation point sets that include the candidate segmentation point, and
      creating, for each of the candidate segmentation point sets, a corresponding alternative segmentation point set associated with the serial data set,
         wherein the alternative segmentation point set includes a number n of alternative segmentation points representing the serial data set as n+1 data segments, where n equals the number of candidate segmentation points in the candidate segmentation point set to which the alternative segmentation point set corresponds, and
         wherein the n alternative segmentation points in the alternative segmentation point set correspond to n of the candidate segmentation points having the greatest counts;
   arranging the alternative segmentation point sets in order of their numbers of segmentation points; and
   presenting the alternative segmentation point sets in a hierarchical view on a display of a computer for selection by a user of the computer of any of the alternative segmentation points from within the hierarchical view.

2. The method according to claim 1 wherein the processing and arranging are performed wherein the serial data set comprises video data.

3. The method according to claim 1 and further comprising presenting the alternative segmentation point sets in order of their numbers of segmentation points.

4. The method according to claim 1 and further comprising segmenting the serial data in accordance with a user-selected one of the alternative segmentation point sets from the hierarchical view.

5. The method according to claim 1 wherein the processing and arranging are implemented in any of
   a) computer hardware, and
   b) computer software embodied in a non-transitory, computer-readable medium.

6. A system for providing a hierarchical view of different options for segmentation of serial data, the system comprising:
   a data segmentation processor configured to process a plurality of candidate segmentation point sets associated with a serial data set, wherein each of the candidate segmentation point sets includes a different number of candidate segmentation points representing the serial data set as one or more data segments in accordance with predefined segmentation criteria, wherein the data segmentation processor is configured to process the plurality of candidate segmentation point sets by
      determining, for each of the candidate segmentation points, a count of the candidate segmentation point sets that include the candidate segmentation point, and
      creating, for each of the candidate segmentation point sets, a corresponding alternative segmentation point set associated with the serial data set,
         wherein the alternative segmentation point set includes a number n of alternative segmentation points representing the serial data set as n+1 data segments, where n equals the number of candidate segmentation points in the candidate segmentation point set to which the alternative segmentation point set corresponds, and
         wherein the n alternative segmentation points in the alternative segmentation point set correspond to n of the candidate segmentation points having the greatest counts; and
   a data segmentation manager configured to
      arrange the alternative segmentation point sets in order of their numbers of segmentation points, and
      present the alternative segmentation point sets in a hierarchical view on a display of a computer for selection by a user of the computer of any of the alternative segmentation points from within the hierarchical view.

7. The system according to claim 6 wherein the serial data set comprises video data.

8. The system according to claim 6 wherein the data segmentation manager is configured to present the alternative segmentation point sets in order of their numbers of segmentation points.

9. The system according to claim 6 wherein the data segmentation manager is configured to segment the serial data in accordance with a user-selected one of the alternative segmentation point sets from the hierarchical view.

10. The system according to claim 6 wherein the data segmentation processor and the data segmentation manager are implemented in any of
    a) computer hardware, and
    b) computer software embodied in a non-transitory, computer-readable medium.

11. A computer program product for providing a hierarchical view of different options for segmentation of serial data, the computer program product comprising:
    a non-transitory, computer-readable storage medium; and
    computer-readable program code embodied in the storage medium, wherein the computer-readable program code is configured to process a plurality of candidate segmentation point sets associated with a serial data set, wherein each of the candidate segmentation point sets includes a different number of candidate segmentation points representing the serial data set as one or more data segments in accordance with predefined segmentation criteria, wherein the computer-readable program code is configured to process the plurality of candidate segmentation point sets by
       determining, for each of the candidate segmentation points, a count of the candidate segmentation point sets that include the candidate segmentation point, and
       creating, for each of the candidate segmentation point sets, a corresponding alternative segmentation point set associated with the serial data set, wherein the alternative segmentation point set includes a number n of alternative segmentation points representing the serial data set as n+1 data segments, where n equals the number of candidate segmentation points in the candidate segmentation point set to which the alternative segmentation point set corresponds, and wherein the n alternative segmentation points in the alternative segmentation point set correspond to n of the candidate segmentation points having the greatest counts, and wherein the computer-readable program code is configured to arrange the alternative segmentation point sets in order of their numbers of segmentation points, and present the alternative segmentation point sets in a hierarchical view on a display of a computer for selection by a user of the computer of any of the alternative segmentation points from within the hierarchical view.

12. The computer program product according to claim 11 wherein the serial data set comprises video data.

13. The computer program product according to claim 11 wherein the computer-readable program code is configured to present the alternative segmentation point sets in order of their numbers of segmentation points.

14. The computer program product according to claim 11 wherein the computer-readable program code is configured to segment the serial data in accordance with a user-selected one of the alternative segmentation point sets from the hierarchical view.

* * * * *